Sept. 12, 1944.    M. A. SIMON    2,358,110
LOADING DEVICE FOR ROTARY RASPS
Filed April 8, 1943

INVENTOR;
MEYER A. SIMON
BY Robert B. Terry
ATTORNEY

Patented Sept. 12, 1944

2,358,110

UNITED STATES PATENT OFFICE 2,358,110

LOADING DEVICE FOR ROTARY RASPS

Meyer A. Simon, Clayton, Mo.

Application April 8, 1943, Serial No. 482,353

4 Claims. (Cl. 29—284)

This invention relates to improvements in loading devices for rotary rasps, and more particularly to an improved holder or support for use in aid of replacement of the tooth elements of certain types of rasps employing replaceable abrading members, for example as an aid in replacement of tacks in the tack band of a tire rasp. The present invention is particularly although not exclusively applicable as an aid in replacement of the tack or nail elements in rasp bands of the improved types constituting the subject matter of an application for patent filed concurrently herewith by this applicant, entitled "Rotary abrading devices" and bearing Serial No. 482,352.

As more particularly pointed out in the co-pending application above referred to, the loading of the tack bands of certain rotary abrading devices has heretofore entailed a considerable amount of time, with a protracted out-of-service period of the associated rasping equipment. The present invention has as a principal object to facilitate the replacement of tacks or like elements in a supporting band therefor, following removal of those which have become worn, distorted or dulled through a period of use.

A further important objective of the invention is attained in a device which will provide a support for a tack band or other form of rotary rasp while charging same with substitute tooth elements, and which, during loading, will prevent retraction or loss by gravity from the band, of the tooth elements earlier assembled into the band.

A further object of the invention is realized in a loading device for the purpose noted, which is so constructed and mounted as inherently to tend to retain the tack band in place on the support, while permitting manual rotation of the band on the support for access to different zones of the band while filling same with replacement teeth or tacks.

A still further object of the invention is attained in a complete tooth-loading agency for the purpose noted, such as to enable completely charging a rasp band with teeth or tacks, and further to enable a quick transfer of the loaded band to a band-receiving pulley or the like.

The foregoing and other objects will more clearly appear from the following detailed description of a presently preferred embodiment of the invention, when considered in connection with the accompanying drawing, in which.

Figure 1:
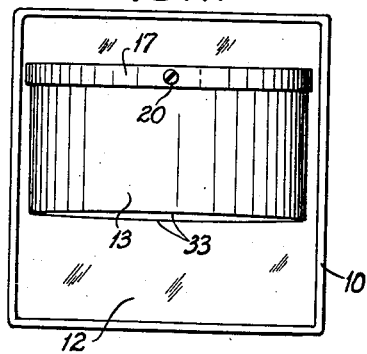
Fig. 1 is a top or plan view of a charging stand and appurtenant parts.

Referring now by characters of reference to the drawing, it is preferred, for reasons of ready portability, to construct the loading device on or as a part of a stand structure, although it will be understood that the essential elements of the loading device as will hereinafter more clearly appear, may be mounted in suspended relation, or in fact to be entirely free of extraneous support. The stand construction when employed, preferably includes a supporting base generally indicated at 10 provided on its corners or marginally, with leg-like supports 11, the base preferably being hollowed or dished to provide a tack receptacle 12 presented just below the band support later described.

Figure 2:
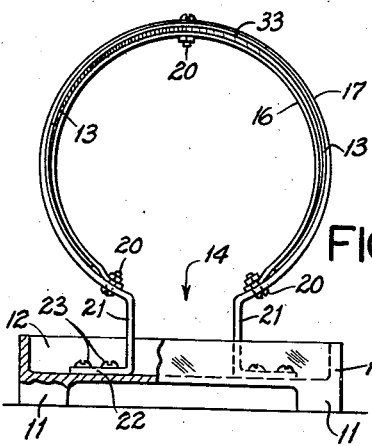
Fig. 2 is a front elevation of the stand and equipment, with certain parts broken away for clearness and minor portions shown in section.

The primary support for the rasp band, as utilized during loading or charging thereof with new teeth, consists of an arcuate saddle element or shelf 13, which is of a generally cylindrical form although of itself it constitutes by preference only an incomplete cylinder. A portion of the arcuate saddle 13 is preferably completely cut away to provide the recess or gap therein indicated at 14 (Fig. 2), for a purpose to appear. It will be understood as preferred, though not strictly necessary that the arcuate extent of the element 13 be as great as shown. The band 13 may be formed of a preferably smooth, moderate gauge sheet metal, and is characterized by a relatively smooth frontal margin or periphery 33 and supported along its rear margin 15 as by one or more clamping bands 16 internally of the saddle, and 17 externally thereof. Assembly may be effected in any suitable manner as by rivets, bolts or the like 20 extending through both elements 16 and 17 and the margin 15 of the band. The outermost ring element 17 may be extended downwardly to form a pair of vertical supports 21 and the latter conveniently turned outwardly as at 22 and secured by holding screws or the like 23 in place on the base 10, whereby the elements 17, 21 and 22 constitute a supporting bracket for the arcuate saddle 13.

Figure 3:
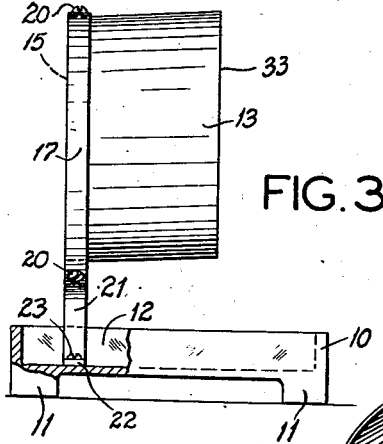
Fig. 3 is a side elevation of the stand and appurtenances of Figs. 1 and 2.

It is a distinct preference as indicated by a period of use of the device for its intended purpose, that the bracket structure 17—21 be tilted somewhat rearwardly as indicated by Fig. 3, so as to dispose the saddle at an angle of a few degrees from the horizontal. The exact extent of this tilt is not critical, but a displacement of the bracket 17 at five to ten degrees from the vertical will aid materially, during charging of the tack band in place on the saddle 13, to prevent any tendency of the tack band to slip forwardly off of the saddle.

In the event it is desired for any reason to hold the arcuate saddle 13 to a minimum area and angular extent, this may be determined by trial to ascertain the effective angle of repose of the teeth or tack elements T in the band. In keeping with the disclosure of the copending application above referred to, it is a present preference to dispose the tacks or like elements T, in floating relation in the tack band TB, whereby they may be readily manually inserted therein without any requirement of impact or pressure, this being possible due to the floating relation of the tacks in the openings therefor in the band. Similarly, upon removal of worn tooth elements, the latter may be readily removed by gravity from the band without the use of a hammer or impact tool of any kind. From this it will become apparent that the minimum angular extent of the arcuate saddle 13 need be only that which is sufficient to prevent falling of the tacks from the apertures of the uppermost portion of the band during charging. Thus the angular extent of the saddle 13 may be, for certain types of band and tack equipment, as little as sixty degrees.

Further in connection with the preference for tilting the bracket 17—21, and hence the saddle 13, it may be noted that there is an advantage in disposing the ring element 17 along the rearmost margin of the saddle. By this provision the ring 17 constitutes a definite marginal stop for the tack band TB while same is in place on the saddle and is being occasionally rotated incident to the application of the tooth elements or tacks T.

Figure 4:
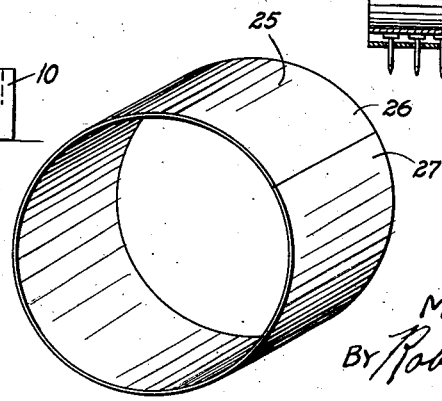
Fig. 4 is an isometric view of a tack-retaining band preferably employed on or in connection with the stand shown by Figs. 1, 2 and 3.
Figure 5:
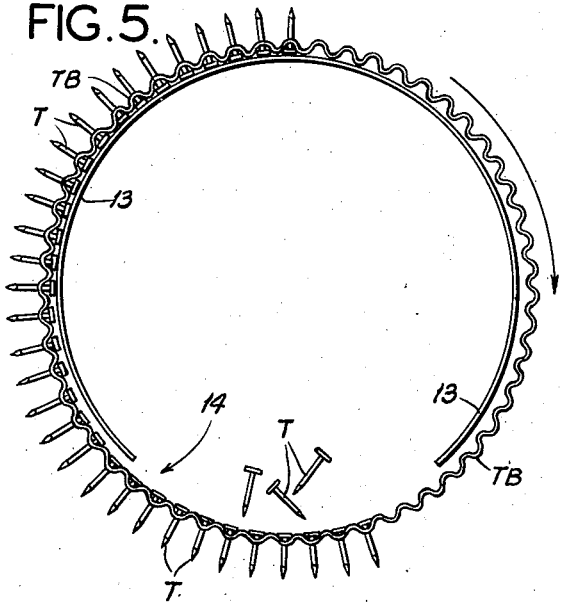
Fig. 5 is an end elevation of a rasp band in partly loaded condition on the stand.
Figure 6:
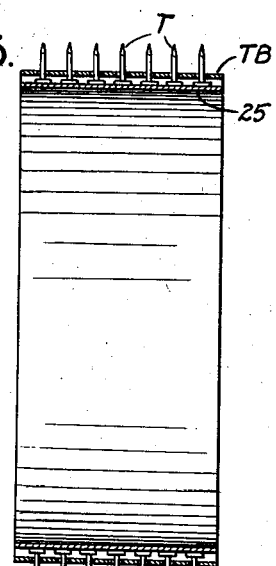
Fig. 6 is a section taken in an axial plane, and illustrating certain of the rows of teeth or tacks in position in the band as loaded and ready for usage, with the retainer band of Fig. 4 in position.

As a convenient part of, or adjunct to the loading stand and device as described, there is preferably employed a cylindrical band, say of spring steel, and of moderate gauge, such as indicated at 25 and best shown by Fig. 4. The band 25 may be referred to as a tack-retaining band and is of split construction from which results adjacent end margins 26 and 27. The diameter of band 25 is such as to conform rather closely to the smallest or inside diameter of the rasp band TB, there preferably being provided a clearance between the saddle 13 and inner surface of the band TB such that the band 25 may be readily edgewise inserted between the saddle and the tack band after the latter is completely charged with replacement tooth elements.

It is a preference in forming the spring collar or tack retainer band 25, that it approximates in width, that of the tack-receiving portion of the tack band TB, whereby the spring collar or tack retainer may serve to keep all of the tacks of the fully charged tack band in protruding relation at least until transfer of the charged tack band to the pulley or the like by which it is operated. The same preference is expressed in relation to the arcuate saddle 13 constituting the charging shelf of the stand shown by Figs. 1, 2 and 3. The effectively exposed area of element 13 should, now obviously, be of a width or depth such as effectively to underlie the toothed area of the tack band.

The manner of usage of the improved loading device is now thought to have been rendered fully apparent from the foregoing description of elements and their purposes. It may however be noted that, incident to substitution of new tooth elements for the dulled, worn or distorted tacks or the like in a rasp band, the elements to be discarded may be removed either with or without the aid of the charging device described. The latter is helpful however in the collection of the discarded elements, in that the latter may be readily removed and returned to the receptacle 12 of the charging stand. The principal advantages of the present device are more readily apparent in the application or replacement of the tacks. The tack band T, cleared of worn rasp elements, is sleeved over the arcuate charging shelf 13, the receptacle 12 cleared of any discarded tacks and used as a receptacle for those now to be applied to the band TB. The operator may now pick up a substantial number of the tacks and place them on the lowermost inner surface of the band TB, and a substantial number thereof will immediately be directed into the openings therefor or readily swept into such openings due to the guiding and directing effect of the tack seats constituted by the corrugations of the band TB, so that charging of the particular zone of the band presented through the aperture 14, is greatly facilitated. Any excess tacks which may not readily find their seats, will again be swept into receptacle 12, the band TB rotated to bring another tack-free zone beneath the charging opening, and the application of tacks repeated as aforesaid until the full periphery of the band TB is completely charged. At this point, the spring collar or band 25 is sleeved over the arcuate support and within the band TB, and the elements TB and 25 removed as a unit with all tacks in place, and edgewise applied to, then over the pulley face or the like constituting the primary support for the charged rasp band. Depending upon the nature of the pulley and securement means for the band TB thereon, the spring collar 25 may or may not be left in place on the pulley during operation of the rasp. It has been found practically advantageous to provide several spares of the tack bands TB and spring collars, whereby to enable charging or reloading of one or more of the bands while others thereof are in service.

The arrangement has been described with particular reference to tire rasp bands and appurtenances, of those types wherein the teeth elements project exteriorly from the band. It will now have become apparent that essentially the same structure may be employed for the insertion and retention of teeth elements in a supporting band therefor of such nature that the elements T project inwardly of the cylindrical band. In the latter case the saddle 13 may be mounted with the recess 14 at the top, the band TB inserted within the saddle and the spring collar 25 be utilized when desired, externally of the band such as TB. Rotary rasps of the latter type are usefully employed for externally abrading cylindrical articles as in cleaning or refinishing operations, and will be understood as distinctly within the purview of the present improvements.

It will now have appeared that loading devices of the type described will serve fully to attain each of the several objectives expressly above stated, and others implied from the more particularized portions of the disclosure. It will be understood, however, that the detail of description of the several features is to be understood in an instructive, and not in any limiting sense, since numerous variations are possible within the scope of the claims hereunto appended.

I claim:

1. In a device for use in aid of replacement of tacks in a rasp band, a partly cylindrical shelf element, a flange piece substantially coincident with one margin of the shelf element, and constituting a limiting stop for a tack band or the like on the shelf element, a vertical support engaging said flange element, a base by which the vertical support is carried, the arcuate shelf being mounted on the support so as to present a bottom opening for the application of tacks or the like from the interior of the cylindrical shelf, the arcuate shelf being tilted somewhat so as to dispose its axis in slightly sloping position a few degrees from horizontal, whereby a tack band or the like on the shelf normally marginally engages the said flange element whereby to keep the tack band in predetermined, yet displaceable, position on the shelf during application of the tacks or the like.

2. In a charging stand assembly for aid in loading the tack band of a rotary rasp, a hollow band support formed on a radius approximating that of the tack band to be charged, and over which the band may be moved during application of the tacks into different areas of the band, the band support being incompletely cylindrical in that it is provided with a gap through which, when the band is in charging position on the support, tacks may be inserted into the band, a band stop located marginally on the support and tending to keep the band in charging position on the support incidental to movement of the band during charging thereof with tacks, and a stand on which the support is fixedly mounted to keep the support in a position of convenient access to an operator.

3. In a device for use as an aid in loading a tack-containing rasp band, a hollow band support formed on a radius approximating that of the tack band to be charged, and over which the band may be rotated during application of the tacks to different areas of the band, the band being of a generally part-cylindrical shape, and characterized by a gap through which tacks may be inserted into a band on the support, a flange projecting radially away from one margin of the support, and tending to keep the band in a position on the support for loading the band with tacks during rotation of the band to different positions on the support, and a stand extended downwardly of the support, the support being secured to the stand in such manner as to keep the support in a nearly horizontal position.

4. In a loading stand assembly for use in filling with tacks, the tack band of a rotary rasp, a hollow support for the band to be loaded, and consisting of a partly cylindrical element formed on a radius approximating that of the tack band to be loaded, and over which the band may be moved during application of the tacks in the various areas of the band, the incompletely circular formation of the band support resulting in a distinct gap of substantial area in the lowermost portion of the support, through which gap tacks may be inserted into the band incident to loading thereof, the band support being entirely free of projections in the various areas thereof to be engaged by the tack band during loading thereof, a marginal abutment projecting outwardly in a radial direction from the band support, and adapted to be engaged by and constitute a guide for the tack band tending to keep the band in loading position on the support, and a stand on which the support is fixedly mounted, the stand being disposed entirely rearwardly of the band support and of a height or length to keep the band support and band thereon, fully clear of the subjacent support of the stand.

MEYER A. SIMON.